(No Model.) 2 Sheets—Sheet 1.
A. E. EASTWICK.
ELECTRIC MOTOR.
No. 389,207. Patented Sept. 11, 1888.
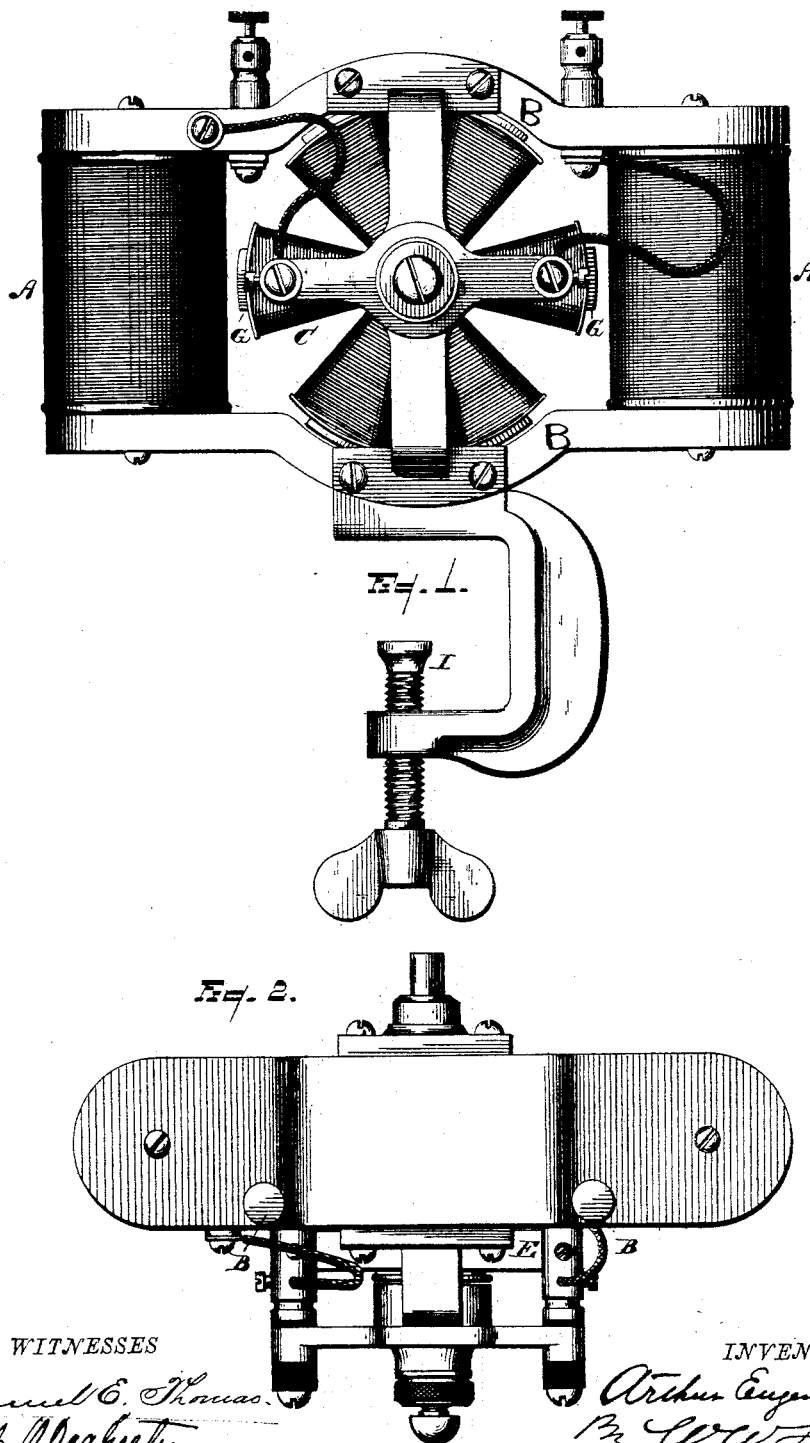
WITNESSES
Samuel E. Thomas
M. B. O'Dogherty
INVENTOR,
Arthur Eugene Eastwick
By W. W. Legg
Attorney.

(No Model.) 2 Sheets—Sheet 2.
A. E. EASTWICK.
ELECTRIC MOTOR.
No. 389,207. Patented Sept. 11, 1888.
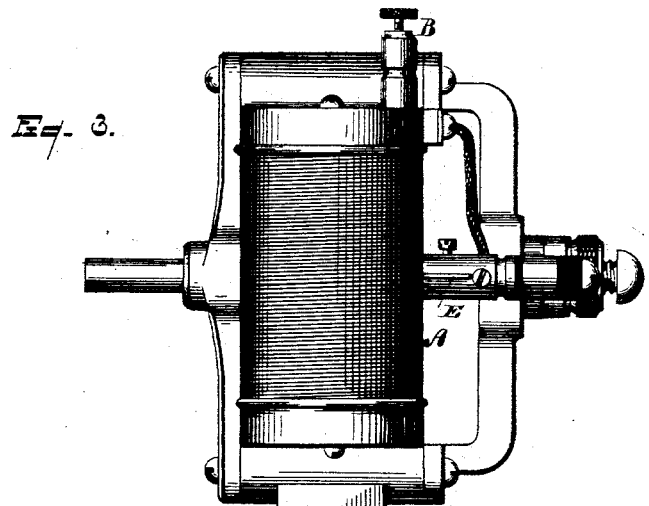
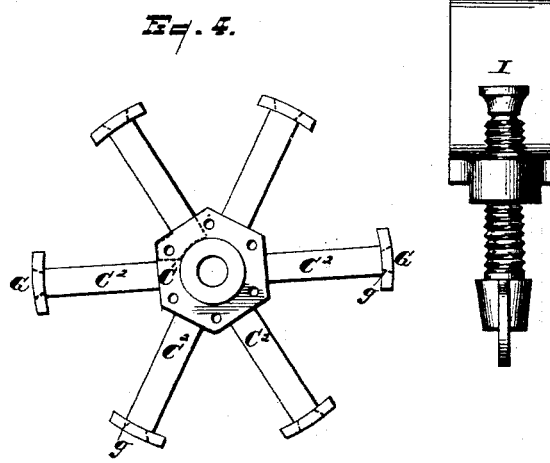
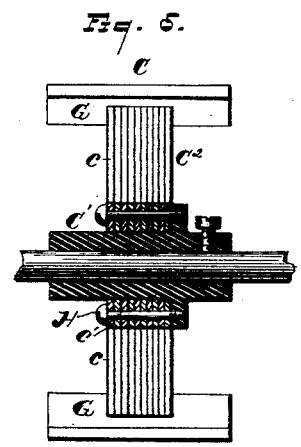
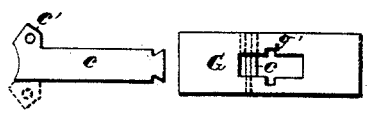
WITNESSES,
Samuel E. Thomas
M. B. Dogherty
INVENTOR,
Arthur Eugene Eastwick
By W. W. Leggett
Attorney.

UNITED STATES PATENT OFFICE.

ARTHUR EUGENE EASTWICK, OF DETROIT, MICHIGAN, ASSIGNOR, BY DIRECT AND MESNE ASSIGNMENTS, OF TWO-THIRDS TO JOHN T. LIGGITT AND ALVA T. HILL, OF SAME PLACE.

ELECTRIC MOTOR.

SPECIFICATION forming part of Letters Patent No. 389,207, dated September 11, 1888.

Application filed January 18, 1888. Serial No. 261,108. (No model.)

*To all whom it may concern:*

Be it known that I, ARTHUR EUGENE EASTWICK, a citizen of the United States, residing at Detroit, county of Wayne, State of Michigan, have invented a certain new and useful Improvement in Motors; and I declare the following to be a full, clear, and exact description of the same, such as will enable others skilled in the art to which it appertains to make and use the same, reference being had to the accompanying drawings, which form a part of this specification.

My invention consists of the combinations of devices and appliances, hereinafter specified, and more particularly pointed out in the claims.

In the drawings, Figure 1 is a view in elevation upon the side adjacent to the commutator of a machine embodying my invention. Fig. 2 is a plan view. Fig. 3 is an end view. Fig. 4 is a separate view, in side elevation, of the armature without its windings of wire. Fig. 5 is a sectional view of the same by a plane passed longitudinally of the axis. Fig. 6 is a separate view of the pieces of sheet metal of which the spokes of the armature are made up. Fig. 7 is a plan view of the plate employed at the end of each spoke.

The invention is designed more particularly for electric motors, although applicable alike to generators of electricity.

My invention consists more particularly in the relative construction and location of the field-magnets, their pole-pieces, and the revolving armature, the said field-magnets being in the plane of the armature-ring and with pole-pieces stretching from core to core over and beneath the armature, so that the armature shall not only be entirely housed at its periphery by the magnets and pole-pieces, but shall revolve in close contiguity to the pole-pieces and adjacent magnets, as more particularly hereinafter described; also, in a peculiar construction of armature, the same being made in the form of radial spokes upon which the bobbins are wound, said spokes each made up of laminæ of sheet-iron, each complete spoke being removable or insertible as a whole; also, in a novel construction whereby the laminæ in each spoke are alternately connected to the laminæ of the adjacent spokes by bolts.

In carrying out my invention, A represents the field-magnets, B the pole-pieces, and C the armature, of my improved motor. D is its commutator, E its brushes, and F the armature-shaft.

The field-magnets A are arranged, as shown, in the plane of the armature C, and the pole-pieces B join the upper and lower ends of the magnet-cores and closely embrace the armature. This construction completely houses the periphery of the armature, so as to shield it against injury from outside sources. The armature is in the form of a hub, C', of brass or diamagnetic material, with radiating spokes $C^2$. The bobbins are wound, as shown, around the spokes upon an interposed insulating material in the usual manner, and at the end of each spoke is an iron plate, G, which constitutes a magnetic head, when the spoke to which it is attached is converted into a magnet by the action of the current in its bobbin.

The operation of the motor will now be understood. The commutator is arranged to change the direction of the current in each of the bobbins at the moment it reaches the middle of either pole-piece B in the usual manner, the field-magnets and bobbins being wound in series. The current, entering at either binding-post, magnetizes the cores of the field-magnets, and their poles of maximum excitement are thus fixed at the middle of each pole-piece B. The bobbins on the armature-spokes receive current in a direction to so polarize each spoke that it shall present an opposite polarity to the polarized section of the field-magnet and their pole-pieces, and the maximum polarity is centered in the magnet head or plate G. As the armature revolves, these plates G pass in very close proximity to the field-magnets and their pole-pieces B. They are therefore in position to receive the greatest attraction while approaching the centers of the pole-pieces and the greatest repulsion as they recede therefrom after their own polarities have been changed. So, also, since the armature revolves in the plane of the field-magnets and very closely thereto, it is evident that the core of the field-magnet begins to attract the adjacent plate G the moment the latter rises past the middle or neutral point of the field-magnet, and this attraction is maintained and increased until the maximum attraction of one for the other is reached at the middle of the pole-piece B, where, by reason of the change in direction of the current in the bobbins, its maximum repulsion begins. This repulsion is then maintained in like manner until the armature-plate G revolves down past the neutral point in the other field-magnet, when attraction again begins.

I will now proceed to describe the peculiar construction of my armature.

Each spoke is made up of laminæ $c$ of sheet-iron. These are each shaped substantially as shown in Fig. 6, with a projecting heel, $c'$, adapted to rest upon the hub and to extend laterally over to the laminæ of the adjacent spoke. These pieces $c$ are arranged side by side, so that each alternate piece shall have its heel $c'$ presenting toward one adjacent spoke, while the other pieces have their heels $c'$ turned toward the other adjacent spoke. In this way the heels $c'$ of one spoke mesh with the heels of both the adjacent spokes, and bolts or screws H serve to unite them all into one solid wheel.

The pieces $c$ are each provided at their outer ends with a dovetail tenon adapted to be passed through the central enlarged opening, $g'$, of the head G and thence shifted laterally along the dovetailed slot $g$ until the pieces $c$ are all in place. The last one inserted would rest in the enlarged opening $g'$, and, if desirable, might be slightly rivet-headed at its outer end to prevent its disengagement. The spoke thus made up has a bobbin wound upon it. It is then placed in its position in the wheel with the other spokes constructed in like manner and united therewith by the bolts or screws H. The spokes can be made of greater or less breadth by simply employing more or less of the pieces $c$ and plates G with correspondingly larger or shorter dovetailed slots $g$.

I is a clutch for engaging the motor to a table or other support, and of course may or may not be employed.

A motor constructed as here described possesses the advantage of extreme simplicity, and its armature is housed so as neither liable to be itself injured nor to become a source of injury to persons or property. The construction is also such, as explained, that each bobbin on the armature and its magnetic core contribute either by attraction or repulsion, throughout the entire circumference of its travel to the power developed by the motor. The motor therefore has a very high efficiency, delivering a great power in proportion to the dimensions of the motor and the current delivered to it. Moreover, the armature is at once exceedingly strong, simple, and efficient. If a bobbin is injured, a new spoke or bobbin may be quickly inserted, or the injured one removed and repaired.

The spoke-armature in which the spokes are made of laminæ of sheet-iron is a very important feature of my invention; but I would have it understood that it is not absolutely essential that the spokes should be thus made of laminæ, but each spoke may be made of solid metal, and the resulting motor would be an improvement, owing to the form and arrangement of its parts over other motors that have preceded it.

What I claim is—

1. In an electric motor, the combination, with the field-magnets and pole-pieces, all arranged in the plane of the armature, of a spoke-armature the spokes of which constitute the cores of the bobbins, each spoke being independently and separately made of strips C, of sheet metal, engaged with a common head, G, at their ends, said spokes at their inner ends being in contact with each other, substantially as and for the purpose specified.

2. An armature made of separate spokes constituting the cores of the bobbins, each spoke composed of pieces $c$, of sheet-iron, with heels $c'$, said pieces arranged side by side to present their heels alternately in opposite directions, said heels adapted to mesh with the corresponding heels of the adjacent spokes, and means for uniting said meshing parts, substantially as described.

3. An armature made of separate spokes constituting the cores of the bobbins, each spoke made of pieces $c$, of sheet-iron, with heels $c'$, presenting alternately in opposite directions, the heels of one spoke adapted to mesh with corresponding heels of the adjacent spokes, and bolts or screws H, whereby they are united, substantially as described.

4. An armature made of separate spokes constituting the cores of the bobbins, each spoke composed of pieces $c$, of sheet metal, with heels $c'$, said pieces arranged side by side to present their heels alternately in opposite directions, said heels being adapted to mesh with the corresponding heels of the adjacent spokes, means for uniting said meshing parts, and the heads G, each provided with a central slot which is engaged by dovetail tenons on the ends of the sheet-metal pieces $c$, substantially as shown and described.

5. The armature-spoke made up of pieces $c$, having heels $c'$, of sheet-iron, their free ends provided with dovetail tenons, and an iron plate, G, provided with a dovetail slot, $g$, with which said tenons are engaged, substantially as described.

In testimony whereof I sign this specification in the presence of two witnesses.

ARTHUR EUGENE EASTWICK.

Witnesses:
M. B. O'DOGHERTY,
W. H. WILLEBRANDS.